June 23, 1964         E. KRANTZ         3,138,442
APPARATUS FOR TREATING DUST-LADEN GAS
Filed April 4, 1961
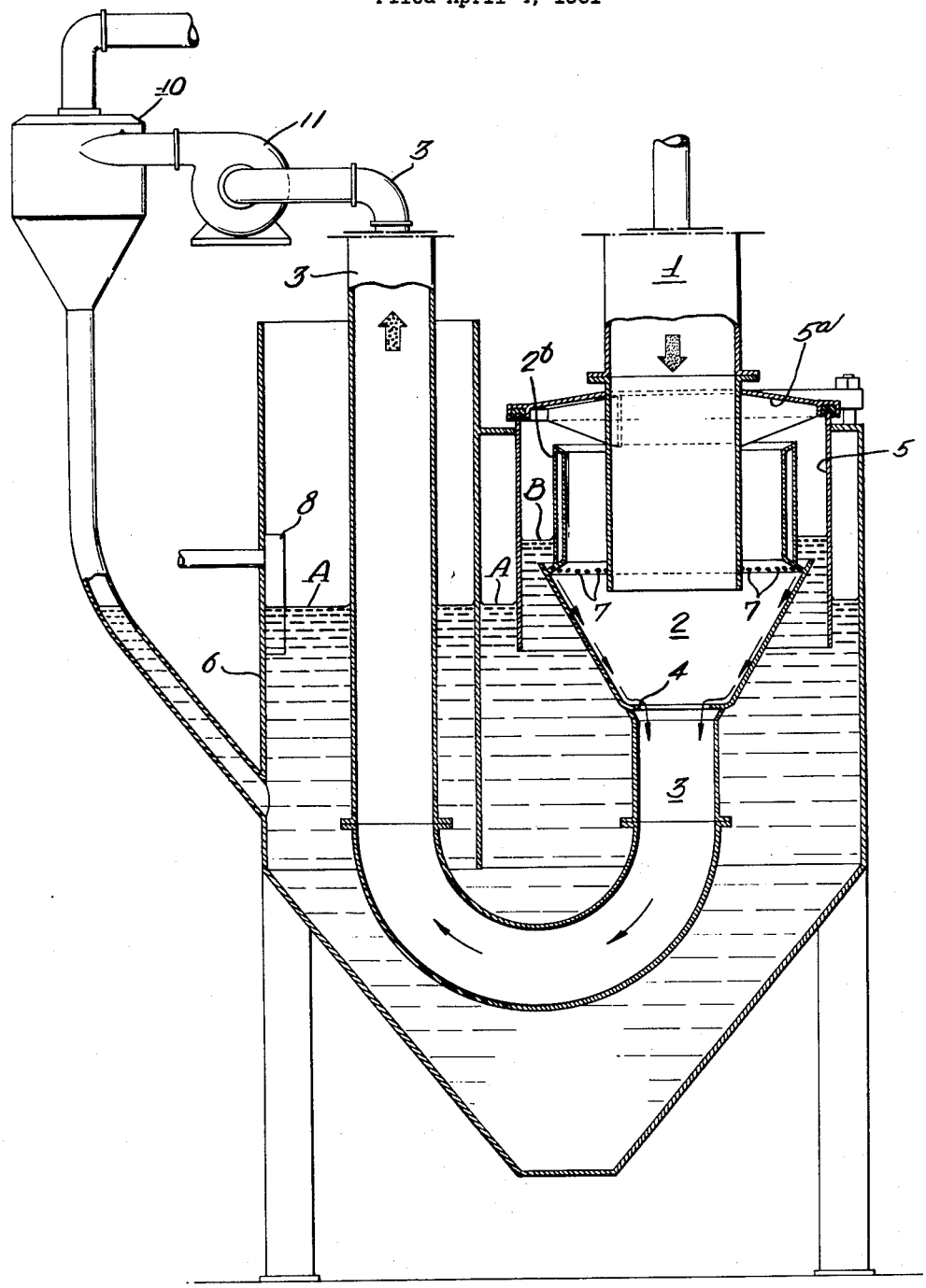
INVENTOR:
EVERT KRANTZ
BY Howson & Howson
ATTYS United States Patent Office 3,138,442
Patented June 23, 1964

3,138,442
APPARATUS FOR TREATING DUST-LADEN GAS
Evert Krantz, Stockholm, Sweden, assignor to Aktiebolaget Svenska Flaktfabriken, Stockholm, Sweden
Filed Apr. 4, 1961, Ser. No. 100,637
Claims priority, application Sweden May 12, 1960
4 Claims. (Cl. 55—227)

The present invention relates to apparatus for treating dust-laden gas and more patricularly to apparatus for wet purifying or conditioning such gas.

It is common practice to treat dust-laden gas by admixing a washing liquid into a flowing stream of gas and thereafter, separating the dust and liquid drops from the gas. This is normally accomplished by injecting the dust-laden gas into an admixing chamber of generally conical form. Washing liquid is caused to flow down the conical walls of the chamber, and to flow into the gas stream at the bottom. The moistened gas stream is drawn through a duct by means of a fan into a precipitator, for instance of the cyclone type in which the dirty washing liquid is separated from the gas and returned to a reservoir. For reasons of economy, the washing liquid is generally recirculated, after the dust particles are settled out, by means of a pump. In addition to consuming energy, the pumps cause an increase in maintenance costs because their components are subject to destruction by the corrosive or otherwise deleterious constituents in the dust.

A primary object of the present invention is to eliminate the need for pumps for the washing liquid.

More specifically, the present invention utilizes the suction pressure of the fan for the gaseous medium to recirculate the washing liquid.

The apparatus of the present invention includes a housing surrounding the admixture chamber which is closed to the atmosphere and is open interiorly to the admixture chamber and is open at the bottom and submerged in the reservoir for the washing liquid. Means is provided to maintain the level in the reservoir above the open bottom of the housing so that the operations of the fan for the dust-laden medium causes its suction to raise the liquid level in the housing to a point where the liquid flows into the admixture chamber through the openings provided.

In the preferred embodiment of the invention, the openings from an outer chamber within the housing into the admixture chamber are sufficiently small to enable the liquid level to build up above the openings, and the height of an inner wall of the outer chamber above the openings where the outer chamber is in open communication with the admixture chamber, is higher than the elevation of the liquid level would be in the event that the inlet to the admixture chamber for dust-laden gas is closed and maximum suction is applied thereto by the fan.

All of the objects of the invention are more fully set forth hereinafter with reference to the accompanying drawing wherein:

The figure is a diagrammatic view in vertical cross section through a preferred apparatus for treating dust-laden gas in accordance with the present invention.

With reference to the drawing, dust-laden gas is introduced by means of an inlet duct 1 into an admixture chamber 2 to which washing liquid is supplied. The moistened dust-laden gas is withdrawn from the admixing chamber to a separator, in the present instance a cyclone 10 by means of an outlet duct 3 and fan 11. The bottom of the admixture chamber 2 is conical in form, narrowing downwardly toward the outlet duct 3 and is provided at its junction with the outlet duct with a throttling flange 4 for dispersing and admixing liquid flowing down the walls of the chamber into the gas stream.

An outer housing 5 surrounds an outer annular chamber and is provided at its upper end with a cover element 5a which seals the upper end of the housing to atmosphere. At its upper end, the outer annular chamber is in open communication with the admixture chamber so that the space within the housing 5 is subject to the suction pressure in the chamber 2. The lower end of the housing 5 is open and is submerged in a reservoir 6 for the washing liquid so that the suction pressure in the chamber 2 operates to raise the washing liquid into the outer chamber of the housing 5. A liquid level control means is provided at 8 to maintain the level of the washing liquid in the reservoir 6 at a predetermined level, such as indicated at A, above the lower end of the housing 5. In order to introduce the washing liquid into the admixture chamber 2, a series of openings 7 are provided about the upper periphery of the conical bottom of the chamber 2. The openings 7 are of a size to permit a proper amount of liquid to flow into the admixture chamber to form a film on the conical walls thereof, but are sufficiently small to permit the liquid level in the outer chamber of the housing 5 to rise above the openings as indicated at B. The openings 7 are below the water level B which is caused by the normal operating suction pressure of the fan 11 relative to the reservoir level A which is maintained by the liquid level control means 8.

In order to prevent flow of liquid from the housing 5 into the chamber 2, except through the openings 7, the chamber 2 has an upper annular wall 2b which serves as the inner wall of the outer annular chamber formed within the housing 5, and which projects upwardly to a height such that if the inlet duct 1 is blocked or otherwise shut off, the maximum suction created by the fan 11, will not cause the liquid level B to rise above the wall 2b. The upper annular wall 2b, the conical bottom, and the connecting ring with the openings 7, constitute an inner housing enclosing the admixture chamber 2.

While a particular embodiment of the present invention has been herein illustrated and described, it is not intended to limit the invention to such disclosure, but changes and modifications may be made therein and thereto within the scope of the following claims.

What I claim is:
1. Apparatus for treating dust-laden gas, comprising in combination, enclosure means forming a washing liquid reservoir, means for maintaining liquid at an approximately fixed level in said reservoir, an outer annular housing having an open lower end disposed in the liquid to a distance below its upper level, a top closure for said outer housing, a supply conduit for dust-laden gas extending down through said top closure into the space within said outer housing, an inner housing disposed within and spaced from said outer housing to form an outer annular chamber therewith, the inner housing being spaced from said gas conduit to form an inner chamber therewith for mixing gas and liquid, the upper end of said inner chamber being spaced above the liquid level and below said top closure to provide top communication between said inner mixing chamber and said outer chamber, a suction tube connected to the bottom of said inner housing for withdrawing gas mixed with liquid therefrom, means for maintaining suction in said suction tube, said supply conduit having its open lower end disposed above the bottom of said inner housing to discharge gas into said mixing chamber, the suction in said tube causing the liquid in said outer chamber to rise above the level of liquid maintained in the reservoir, and said inner casing having means above its bottom end pro- viding for the flow of liquid from said outer chamber into the inner mixing chamber.

2. Apparatus as set forth in claim 1, further characterized by the fact that said mixing chamber has a conical lower end with the small end downward and that a throttling flange is provided at the lower end to direct the downflowing liquid and gas inwardly for aiding in their admixture.

3. Apparatus as set forth in claim 1, further characterized by the fact that openings are provided at the upper end of the conical bottom of said mixing chamber for the inflow of liquid around the circumference of the mixing chamber and that said inner housing extends above said openings, said openings being of such size that liquid is caused to rise by the suction created above the level of the openings.

4. Apparatus as set forth in claim 1, further characterized by the fact that the upper end of said inner casing is sufficiently high to prevent the overflow of liquid over its top edge at the maximum suction created.

References Cited in the file of this patent

UNITED STATES PATENTS

| | | |
|---|---|---|
| 679,108 | Clarke | July 23, 1901 |
| 940,141 | Fogarty | Nov. 16, 1909 |
| 2,551,890 | Love | May 8, 1951 |